United States Patent [19]

Wenzel et al.

[11] Patent Number: 4,786,327

[45] Date of Patent: * Nov. 22, 1988

[54] DYE PREPARATION FOR THERMAL INK-JET PRINTHEADS USING ION EXCHANGE

[75] Inventors: Donald E. Wenzel, Albany; Loren E. Johnson; Hiang P. Lauw, both of Corvallis, all of Oreg.

[73] Assignee: Hewlett-Packard Company, Palo Alto, Calif.

[*] Notice: The portion of the term of this patent subsequent to Aug. 2, 2005 has been disclaimed.

[21] Appl. No.: 912,868

[22] Filed: Sep. 29, 1986

[51] Int. Cl.$^4$ .............................................. C09D 11/02
[52] U.S. Cl. ...................................... 106/22; 106/20; 106/23
[58] Field of Search ............................ 106/20, 22, 23; 523/161

[56] References Cited

U.S. PATENT DOCUMENTS

| | | | |
|---|---|---|---|
| 4,605,442 | 8/1986 | Kauashita | 106/22 |
| 4,620,876 | 11/1986 | Fujii et al. | 106/22 |
| 4,631,085 | 12/1986 | Kauanishi et al. | 106/22 |
| 4,685,968 | 8/1987 | Palmer | 106/23 |

*Primary Examiner*—Josephine Barr
*Attorney, Agent, or Firm*—William J. Bethurum

[57] ABSTRACT

A process is provided for reducing the crusting propensity of dyes, complexed with sodium or other cations, used in ink-jet print heads and for improving other properties of such dyes. The process comprises replacing at least a portion of the cations on such dyes with preselected cations, such as those of the alkali metals lithium, potassium, ammonium, and amines. A two-step process may be used, in which the sodium cations first are at least partially replaced with hydrogen cations by passing an aqueous solution of the dye through the hydrogen form of a strong acid ion exchange resin and the hydrogen cations subsequently are at least partially replaced with the preselected cations by neutralizing the hydrogen-containing dye solution with a base which contains the preselected cation species. Alternately, a one-step process, comprising passing the aqueous solution of the dye through an ion-exchange resin pre-loaded with the preselected cations may be employed.

24 Claims, No Drawings

4,786,327

DYE PREPARATION FOR THERMAL INK-JET PRINTHEADS USING ION EXCHANGE

TECHNICAL FIELD

The present invention is directed to preparation of inks employed in ink-jet printing, and, more particularly, to an improved process for preparing ink compositions used in thermal ink-jet printing.

BACKGROUND ART

In a modern thermal ink-jet printhead device, resistors used to propel bubbles of ink toward the paper substrate must be able to fire for millions of times without failure. In thermal printhead printing, the purity and chemical structure of the dye in the ink can radically affect the printhead operation, resulting in resistor failure or nozzle clogging.

Changing the cation of the dye molecule improves the solubility of the dye molecule in the solvent, which prevents crusting (clogging of the printhead nozzle from dye precipitation during storage). Selection of the proper cation can also significantly improve resistor life of the printhead. Substitution of FD&C Blue Dye #1 improves resistor life from about 13 million firings to about 25 million firings by changing the cation associated with the dye from sodium to triethanol amine.

In one process developed by the assignee of the present application, such cation substitution is achieved by reverse osmosis (ultrafiltration). The process is quite useful for purification of the dye. However, while producing highly acceptable dyes (in which the extend of cation substitution is controlled), reverse osmosis requires an expenditure of processing time operating at pressures of about 100 to 300 psi that may be unacceptable for some manufacturing processes.

Accordingly, a need remains for a more rapid process for improving the properties of dyes used in ink-jet printing.

DISCLOSURE OF INVENTION

It is an object of the present invention to provide a process for reducing crusting of dyes used in ink-jet printing.

It is another object of the present invention to provide a process for improving the properties of dyes used in ink-jet printing by cation substitution.

It is yet another object of the present invention to provide a process for increasing the efficiency of cation substitution, as measured by a decrease in processing time, on dyes used in ink-jet printing.

It is a further object of the present invention to provide a process for the controllable and facile substitution of cations on dyes used in ink-jet printing.

These and further objects of the invention will become more readily apparent upon a consideration of the following commentary.

Briefly, a process is provided for the fabrication of ink compositions used in ink-jet printing. The process is suitably employed for dyes employed in such inks having at least one negatively charged functional group, such as a sulfonate group, with which sodium or other cations are associated.

The process comprises dissolving the dye in water to form a dye solution, replacing the cations with hydrogen cations by ion exchange, and replacing the hydrogen ions by preselected cations which impart certain desired properties, such as reduced crusting, to the ink.

The cation-exchanged dye solution is then blended with one or more glycols or other components to formulate the desired ink composition.

Alternatively, the desired cation species may be loaded onto a resin in an ion-exchange column, and the sodium or other cations replaced directly with the desired cation species if the proper affinity of the dye to resin can be chosen.

Ion exchange is a very fast and efficient process for replacement of one cation species by another. Further, certain cations, such as divalent cations, that cannot be substituted onto the dye molecule by other processes, such as reverse osmosis, can be substituted by ion exchange.

BEST MODES FOR CARRYING OUT THE INVENTION

Commercially prepared dyes are presently available complexed with sodium cations. Thus, it will be appreciated that the discussion which follows is given in terms of partially or totally replacing sodium cations with certain desirable cations; the resulting modified dye evidences improved properties over the sodium form. However, it should be understood that the process of the invention may be used to replace any cation on a dye molecule with another cation.

In the practice of the process of the invention, it is preferred that the dye first be purified. While not essential to the practice of the invention, the purification step improves the efficiency of the ion exchange process.

Dye purification is best accomplished by reverse osmosis. In this process, chloride, excess sodium, and impurities, which are present in the dye as received from the manufacturer, are removed from the dye.

In the purification of the dye, the dye is first dissolved in water in an amount ranging from about 8 to 15 wt %, or up to the solubility limit of the dye, to form a dye solution. The lower concentration is constrained by economic considerations, with the overall process consuming too long a period of time at concentrations much below about 8 wt %. The upper concentration is constrained by the presence of too much dye clogging the membrane in reverse osmosis purification.

The dye solution is then purified by reverse osmosis, using spiral wound, plate and frame or open tubular type systems or variations thereof. For a spiral wound system, for example, the pressure may range from about 100 to 300 psi and the flow (which is a function of the membrane employed) is typically maintained in the range of about 1 to 3 gal/min per pressure vessel of 100 to 200 ft$^2$ of membrane area.

While the reverse osmosis process is ordinarily operated at room temperature, it may be operated at an elevated temperature, limited only by the composition of the membrane or the boiling point of the solution. In practice, the temperature may range from about 0° to 100° C. It is possible to utilize several pressure vessels in parallel, which provides a corresponding increase in surface area. Further, series configurations may be employed; such configurations are also well-known.

As is well-known, the feed stock in the pressure vessel is separated by the membrane into a concentrate (which contains the dye) and the permeate (which contains impurities and a small amount of the dye).

The reverse osmosis process is used to remove chloride ions, excess sodium ions and other impurities and to provide a dye that has a purity of about 99.9%. The conductivity of the concentrate is monitored, conveniently using a chloride electrode, until a substantially constant reading is achieved and equilibrium is reached, which indicates that no more purification is taking place. The purified dye still has sodium cations associated with the sulfonate groups on the dye. In accordance with one embodiment of the invention, the sodium ions are replaced, first with hydrogen cations, then replacing the hydrogen ions with the desired cation species.

The replacement with hydrogen ions is accomplished by ion exchange, involving passing an aqueous solution of the dye through the hydrogen form of a strong acid ion exchange resin. The sodium cations from the dye molecule are retained on the ion exchange resin and the solution passing through the resin becomes the acid form of the dye. Suitable ion exchange resins are so-called strong acid ion exchange resins, such as Dowex 50X-8, available from Dow Chemical Company (Midland, MI), Duolite Cation Resin 225X 10H, available from Rohm & Haas (Philadelphia, Pa.), and Amberlite CG 120, also available from Rohm & Haas. Many other strong acid ion exchange resins are also commercially available.

In order to obtain the desired free acid form of the dye, the amount of resin to be used must be determined. This is conveniently done by determining the milliequivalents of $H^+$ per milliliter of wet resin. Knowing the concentration of the dye and the number of sulfonate groups on the dye (for example, for Food Black 2 there are four such groups), one can easily determine the theoretical amount of resin required from literature values.

Next, the free acid form of the dye, which has a pH of less than 1 to about 2, depending on the ratio of dye to resin, is neutralized with a base which includes the desired cation species, thereby replacing at least a portion of the hydrogen ions with the preselected cation species. Suitable cation species include mono- and divalent cations, such as alkali and alkaline-earth cations, ammonium cations, quaternary ammonium salts, protonated primary, secondary and tertiary amines and the like. Preferred examples of such cations include lithium and potassium, tetramethyl amine ($(CH_3)_4N^+$), triethanol amine ($(C_2H_5OH)_3NH^+$) and diethylene amine ($(C_2H_5)_2HNH^+$). Conveniently, the anion of the base is hydroxide, which combines with the hydrogen cations on the dye to form water.

Desirably, the base is added until the pH of the dye solution is in the mildly acidic to mildly basic range, about 4 to 10. Preferably, the base is added to obtain a dye solution of a mildly basic pH, such that upon subsequent addition of components to form the ink, the requisite final pH is achieved. This eliminates an extra pH adjustment step. A pH meter is conveniently employed to monitor the pH of the dye solution during the neutralizing process.

During the foregoing ion exchange and neutralizing steps, the dye solution has been diluted from its initial concentration. The dye solution is next concentrated to return the concentration to a desired level. Reverse osmosis is again advantageously employed to remove excess water, and requires about one-half the time of the purification process. UV/visible spectrophotometry is employed to monitor the concentration.

Finally, the vehicle is added to the dye solution to form the ink. The vehicle may comprise any of, or a mixture of two or more of, the following components: glycols such as ethylene glycol, diethylene glycol, triethylene glycol, tetraethylene glycol, propylene glycol, dipropylene glycol, tripropylene glycol, 1,3-butanediol, 1,4-butanediol, 1,5-pentanediol, 1,6-hexanediol, 2,5-hexanediol, hexylene glycol, glycerol, half ethers and ethers of propylene glycols such as propylene glycol monomethyl ether, propylene glycol isopropyl ether, propylene glycol n-butyl ether, propylene glycol ethyl ether, dipropylene glycol monomethyl ether, dipropylene glycol ethyl ether, dipropylene glycol n-butyl ether, dipropylene glycol isopropyl ether, tripropylene glycol monomethyl ether, tripropylene glycol ethyl ether, tripropylene glycol n-butyl ether, tripropylene glycol, ethers of glyceryl such as glyceryl α-monomethyl ether, glyceryl α,γ-dimethyl ether, glyceryl α-mono-n-butyl ether, alcohols such as sec-butyl alcohol, tert-amyl alcohol, cyclohexyl alcohol, sec-octyl alcohol, diacetone alcohol, benzyl alcohol, iso-propanol, n-propanol, methanol, ethanol, esters such as butyl lactate, ethyl lactate, n-butyl propionate, polymeric glycols such as PEG 200, PEG 300, PEG 400, PPG 400, and water.

Further, the vehicle may include any of the additives used in ink-jet compositions, such as surfactants to improve the wettability of the ink on paper, polymers to help control bubble formation of inks in thermal ink-jet printers, fungicides, and bactericides. The purity of the components used in preparing the inks of the invention is that found in normal commercial practice.

The ion-exchange resin may be regenerated for treating another dye solution. The regeneration is conveniently done by passing hydrochloric acid or sulfuric acid through the column and then washing with water until the pH of the rinse is approximately neutral. This process leaves behind only $H^+$ on the resin.

It is well-known that sodium cations associated with a dye such as Food Black 2 cause crusting. The process of the invention provides a dye having a cation species, such as one listed above, which has been found to reduce crusting of the ink.

Yet, sodium-containing dyes often have better kogation properties than many of the cation-substituted dyes. Kogation is a coined term, unique to thermal ink-jet printing, which describes the extent of decomposition of the ink on the resistors of thermal ink-jet printers as a consequence of heating. Such heating is used to form droplets of ink, which are propelled toward the substrate.

Often, a balance between the desirable low crusting properties of the cation-substituted dye and the desirable low kogation properties of the sodium-containing dye may be achieved by blending the cation-exchanged dye with sodium-containing dye, the latter possibly purified by the reverse osmosis process described above to remove excess sodium.

In formulating such a blend, many factors will ordinarily be considered, such as the construction of the ink pen, that is, the resistor design, how hot the resistors are fired, the character of the surface (the extent of carbon sticking from the decomposition of the ink, or kogation), the thickness of layers for heat transfer, and so forth.

While the two-step process (ion exchange plus neutralization) described above may be utilized in the practice of the invention, it may be desirable to skip the hydrogen cation substitution and go directly to the exchange of the sodium cations with the cation species of choice. However, while this approach will certainly work, and the process of the invention contemplates this alternative approach, the one-step process is not as efficient as the two-step approach.

The one-step process results in the use of a considerable quantity of expensive base to effect the ion exchange during regeneration of the column, with a consequent waste of base. Further, the larger the cation, the more steric hindrance of the cation plays a role in the ion substitution process. Finally, the selectivity of the resin for the two cations (cation on resin, cation on dye) becomes important. This is known as the partition function of the resin. Use of the two-step process is preferred, since it is easier to predict results by first preparing the free acid form of the dye and then neutralizing to obtain the desired cation-substituted form of the dye.

Ion exchange is a very fast and efficient process for replacement of one cation species with another. Further, ion exchange can be used to replace cations on the dye molecules that could not be easily accomplished by other techniques, such as reverse osmosis.

INDUSTRIAL APPLICABILITY

The process of the invention is useful in the preparation of inks used in ink-jet printing, and particularly in thermal ink-jet printing.

EXAMPLES

EXAMPLE 1

Substitution of TEA on Food Black 2 Dye Via Ion Exchange

A column containing about 5.3 l of Duolite Cation resin 225X 10H was regenerated with 2 l of 18% hydrochloric acid. The column was then washed with deionized (DI) water until the pH was 4.2.

A 20.5 Kg sample of Food Black 2 dye, purified by conventional reverse osmosis and evidencing by UV/visible spectrophotometry an average absorption of 0.2518 in a dilution of 1:10,000 over the range of 350 to 700 nm, was passed through the column at a flow rate of 500 ml/min, followed by DI water until most of the color was collected. With good column performance, less than 1 l of water should be required for each liter of dye.

The ratio of dye to resin was chosen so that the dye was partially in the hydrogen form and had a pH of 1.9. The dye was then neutralized with an aqueous solution of 1.16 Kg of triethanol amine (TEA) to a pH of 6.5.

The number of moles of sodium per mole of dye prior to the ion exchange treatment was determined to be 3.20. Following ion exchange, the number of moles of sodium per mole of dye was determined to be 0.85, while the number of moles of TEA per mole of dye was determined to be 2.66.

The substituted dye was then concentrated by conventional reverse osmosis and idethylene glycol added to obtain the final ink composition desired. The ink comprised 4.2 wt % of the dye (a mixture of treated and untreated dye to provide 1.78 moles of TEA per mole of dye) in a vehicle comprising 50/50 (by volume) of DEG and water.

EXAMPLE 2

Substitution of TEA on Food Black 2 Dye Via Ion Exchange

The column was prepared as in Example 1. A 10.08 Kg sample of FB2 dye (absorption by UV/visible spectrophotometry of 0.258 under the conditions described in Example 1) was ion exchanged using down flow with good column performance. The solution pH was 1.8 which was neutralized with an aqueous solution of 0.60 Kg of TEA.

The number of moles of sodium per mole of dye prior to the ion exchange treatment was determined to be 3.20. Following ion exchange, the number of moles of sodium per mole of dye was determined to be 0.78, while the number of moles of TEA per mole of dye was determined to be 2.64.

The resulting product was concentrated by reverse osmosis and formulated into the final ink composition by the addition of diethylene glycol. The ink comprised 4.2 wt % of the dye (a mixture of treated and untreated dye to provide 1.78 moles of TEA per mole of dye) in a vehicle comprising 50/50 (by volume) of DEG and water.

Ink samples from the dyes treated in Examples 1 and 2 were used to fill six pens from each for testing. The six pens showed no crusting and normal kogation (low) compared to an ink prepared from sodium-containing dye not treated in accordance with the invention. The amount of kogation increased from low to moderate with increasing TEA to dye mole ratio. The optimum balance of reduced crusting and acceptable kogation occurred with dye having about 1.8 moles of TEA per mole of dye.

EXAMPLE 3

Ion Exchange of Acid Yellow 23

The cation exchange column contained 1.5 l of resin and was regenerated with 250 ml of 36% HCl diluted 1:3 and washed with DI water until the pH was about 5.5. To the column was added 1.0 l Acid Yellow 23 (FD&C Yellow 5) at 10% concentration. The dye was eluted with DI water, and 1600 ml of a light yellow material was collected, the remainder being discarded.

The pH of the collected material was about 1.0, and was subsequently neutralized with TEA. To obtain a pH of about 6.7, 95.1 g of 97% TEA was required to neutralize the collected material.

The neutralized material was vacuum evaporated to concentrate the dye. Measurement by UV/visible spectrophotometry of absorption at 426 nm showed an absorption of 0.8195 at a dilution of 1:10,000, indicating a dye concentration of 154.6 g/l. The calculated number of TEA moles per mole of dye was 2.5.

Ink was made from the substituted dye, having the following properties:

dye load: 4% by weight
pH: 6.33
$[Cl^-]$: <5 ppm

The ink comprised 4 wt % of the treated dye, having 3 moles of TEA per mole of dye, in a vehicle comprising 50/50 (by weight) DEG and water.

The ink was evaluated in an ink-jet print head for crusting, kogation and thin film reliability. Where dye crystals (crusting) would form after two days at room temperature with sodium-based dye, no crusting was observed with this ink. Preliminary testing also showed thin film reliability (resistor life) to increase by a factor of at least 2, while kogation went from low to moderate (for the life of the pen).

EXAMPLE 4

Ion Exchange of FD&C Blue 1

The cation exchange column was loaded with 1.5 l of resin and was regenerated. To the column was added 1.0 l of concentrated FD&C Blue 1 in solution. The column was eluted with DI water, and about 2.5 l of material was collected. The pH was adjusted with TEA to a value between 6 and 7. The resulting TEA-substituted dye was concentrated on a spiral wound reverse osmosis system with cellulose acetate membranes having a pore size of 11 l at 150 psig and 25° to 30° C.

The absorption by UV/visible spectrophotometry was 1.51 at a 1:10,000 dilution. The dye solution was determined by atomic absorption to have 180 ppm sodium, compared to 1690 ppm for the dye prior to ion exchange at 97.5 g/l dye.

Inks were made comprising a dye mixture of 2.2 wt % of treated FD&C Blue 1, 1.3 wt % of untreated Direct Yellow 86 and 1 wt % of untreated Direct Red 227 in a vehicle of 50/50 (by volume) of DEG and water. The dye mixture contained 1.8–2 moles of TEA per mole of dye.

Inks based on the substituted blue dye had good thin film reliability. No resistor failures occurred up to 100 million firings, while inks based on the sodium form of the dye showed on the average 3 failures per 20 pens at less than 50 Mdots.

EXAMPLE 5

Carta Black Dye Substituted with Lithium

Carta Black dye was ion exchanged and substituted in a similar way as described above with lithium cations in an attempt to improve kogation. An ink was made comprising 2.5 wt % of the treated dye in a vehicle of 50/50 (by volume) of DEG and water. Initial studies did not indicate a significant improvement in kogation.

EXAMPLE 6

Food Black 2 Dye Substituted with Tetramethyl Ammonium

Food Black 2 dye was ion exchanged and substituted with tetramethylammonium (TMA) cations, using procedures as set forth in Example 2. The ink made from this dye comprised 5 wt % treated dye (0.3 moles of sodium per mole of dye) in a vehicle of 50/50 (by volume) DEG and water. The ink had excellent crusting properties compared to the sodium form of Food Black 2 dye.

EXAMPLE 7

Direct Red 227 Substituted with TEA

Direct Red 227 dye was ion exchanged and substituted with triethanol amine cations, using the procedures as in Example 4. An ink was made from 2.9 wt % of a mixture of treated and untreated Direct Red 227 and 1.1 wt % of untreated Direct Yellow 86 in a vehicle of 50/50 (by weight) DEG and water. The dye mixture had 1.8 moles of TEA per mole of dye.

Ink prepared with the treated dye evidence improved reliability of firing over the untreated dye. EXAMPLE 8

Direct Red 227 Substituted with TMA

Direct Red 227 dye was treated as in Example 7, except that tetramethylammonium cations were employed as the substituting species. Ink prepared with the treated dye evidence less viscous plugging of the orifices and decreased nickel corrosion of the orifice plate than inks prepared with the untreated dye.

Thus, there has been disclosed a process for reducing the crusting properties of sodium-containing dyes used in ink-jet printing. The process includes ion exchange and replaces at least a portion of the sodium cations with preselected cations. Many changes and modifications will be readily apparent to those of ordinary skill in the art, and all such changes and modifications are deemed to be within the scope of this invention, as defined by the scope of the appended claims.

What is claimed is:

1. A process for preparing an ink composition comprising a vehicle and a dye having associated therewith at least one sulfonate group with which a first cation species is associated, said ink composition suitable for use in ink-jet printing, said process comprising:
    (a) replacing at least a portion of said first cation species on said dye with a preselected second cation species comprising at least one member selected from the group consisting of alkali metals, alkaline-earth metals, quaternary amines, protonated primary, secondary and tertiary amines and ammonium, employing an ion exchange resin, to form an ion-exchanged dye; and
    (b) admixing said ion-exchanged dye with said vehicle to form said ink.

2. The process of claim 1 wherein said dye containing said first cation species is purified prior to said cation-replacing.

3. The process of claim 2 wherein said dye is purified by reverse osmosis.

4. The process of claim 1 wherein said first cation species consists essentially of sodium.

5. The process of claim 1 wherein at least a portion of said first cation species on said dye is replaced with hydrogen cations by passing an aqueous solution of said dye through the hydrogen form of a strong acid ion exchange resin.

6. The process of claim 5 wherein at least a portion of said hydrogen cations on said dye are subsequently replaced by said preselected second cation species by neutralizing said dye in a base comprising said preselected cation species and hydroxide anions.

7. The process of claim 6 wherein said hydrogencontaining dye is neutralized to a pH ranging from about 4 to 10.

8. The process of claim 1 wherein at least a portion of said first cation species on said dye are replaced with said preselected second cation species by passing an aqueous solution of said dye through an ion exchange resin loaded with said preselected second cation species.

9. The process of claim 1 wherein said preselected second cation species comprises at least one member selected from the group consisting of lithium, potassium, tetramethyl amine, triethanol amine, diethylene amine, and ammonium.

10. The process of claim 1 wherein following said ion exchange, said dye solution is concentrated to a desired concentration.

11. The process of claim 10 wherein said dye solution is concentrated using reverse osmosis.

12. The process of claim 1 wherein said vehicle comprises at least one component selected from the group consisting of glycols, glycerol, half ethers and ethers of propylene glycols, ethers of glyceryl, alcohols, esters, polymeric glycols, and water.

13. The process of claim 12 wherein said at least one component comprises a member selected from the group consisting of ethylene glycol, diethylene glycol, triethylene glycol, tetraethylene glycol, propylene glycol, dipropylene glycol, tripropylene glycol, 1,3-butanediol, 1,4-butanediol, 1,5-pentanediol, 1,6-hexanediol, 2,5-hexanediol, hexylene glycol, propylene glycol monomethyl ether, propylene glycol isopropyl ether, propylene glycol n-butyl ether, propylene glycol ethyl ether, dipropylene glycol monomethyl ether, dipropylene glycol ethyl ether, dipropylene glycol n-butyl ether, dipropylene glycol iso-propyl ether, tripropylene glycol monomethyl ether, tripropylene glycol ethyl ether, tripropylene glycol n-butyl ether, tripropylene glycol, glyceryl α-monmethyl ether, glyceryl α,γ-dimethyl ether, glyceryl α-mono-n-butyl ether, secbutyl alcohol, tert-amyl alcohol, cyclohexyl alcohol, secoctyl alcohol, diacetone alcohol, benzyl alcohol, isopropanol, n-propanol, methanol, ethanol, butyl lactate, ethyl lactate, n-butyl propionate, PEG 200, PEG 300, PEG 400, and PPG 400.

14. A process for preparing an ink composition comprising a vehicle and a dye having associated therewith at least one sulfonate group with which sodium cations are associated, said ink composition suitable for use in ink-jet printing, said process comprising:
  (a) replacing at least a portion of said sodium cations on said dye with hydrogen cations to form a dye containing hydrogen cations by passing an aqueous solution of said dye through the hydrogen form of a strong acid ion exchange resin;
  (b) neutralizing said dye containing said hydrogen cations by adding a base comprising a preselected cation species comprising at least one member selected from the group consisting of alkali metals, alkaline-earth metals, quaternary amines, protonated primary, secondary and tertiary amines and ammonium and an anion species comprising hydroxide to form a dye solution containing said preselected cations and having a pH ranging from about 4 to 10; and
  (c) admixing said neutralized dye solution with said vehicle to form said ink.

15. The process of claim 14 wherein said dye containing said sodium cations is purified prior to said cationreplacing.

16. The process of claim 15 wherein said dye is purified by reverse osmosis.

17. The process of claim 14 wherein said amine comprises at least one member selected from the group consisting of tetramethyl amine, triethanol amine, and diethylene amine.

18. The process of claim 14 wherein said following said neutralizing, said dye solution is concentrated to a desired concentration.

19. The process of claim 18 wherein said dye solution is concentrated using reverse osmosis.

20. The process of claim 14 wherein said vehicle comprises at least one glycol.

21. The process of claim 20 wherein said glycol comprises a member selected from the group consisting of diethylene glycol, triethylene glycol, and polyethylene glycol.

22. A process for preparing an ink composition comprising a vehicle and a dye having associated therewith at least one sulfonate group with which sodium cations are associated, said ink composition suitable for use in ink-jet printing, said process comprising:
  (a) forming an aqueous dye solution of said dye;
  (b) purifying said dye solution to remove chloride ions, excess sodium ions and impurities;
  (c) replacing at least a portion of said sodium cations on said dye with hydrogen cations to form a dye containing hydrogen cations by passing said aqueous solution of said dye through the hydrogen form of a strong acid ion exchange resin;
  (d) neutralizing said dye containing said hydrogen cations by adding a base comprising a preselected cation species comprising at least one member selected from the group consisting of alkali metals, alkaline-earth metals, quarternary amines, protonated primary, secondary and tertiary amines and ammonium and an anion species comprising hydroxide to form a dye solution containing said preselected cations and having a pH ranging from about 6 to 7;
  (e) concentrating said dye solution to achieve a desired concentration; and
  (f) admixing said ion-exchanged dye with said vehicle to form said ink, said vehicle comprising at least one glycol.

23. The process of claim 22 wherein said amine comprises at least one member selected from the group consisting of tetramethyl amine, triethanol amine, and diethylene amine.

24. The process of claim 20 wherein said glycol comprises a member selected from the group consisting of diethylene glycol, triethylene glycol, and polyethylene glycol.

* * * * *